Nov. 7, 1961 W. B. TEMPLETON 3,007,564
CARRIAGE TABULATION CONTROL MECHANISM
FOR CALCULATING MACHINES
Filed March 12, 1958 5 Sheets-Sheet 1

INVENTOR.
WILLIAM B. TEMPLETON
BY
Wallace P. Lamb
ATTORNEY.

INVENTOR.
WILLIAM B. TEMPLETON
BY
Wallace P. Lamb
ATTORNEY.

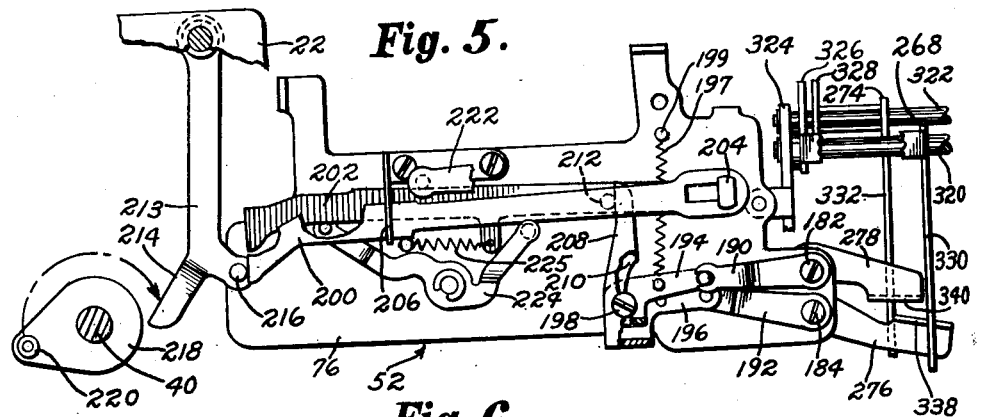
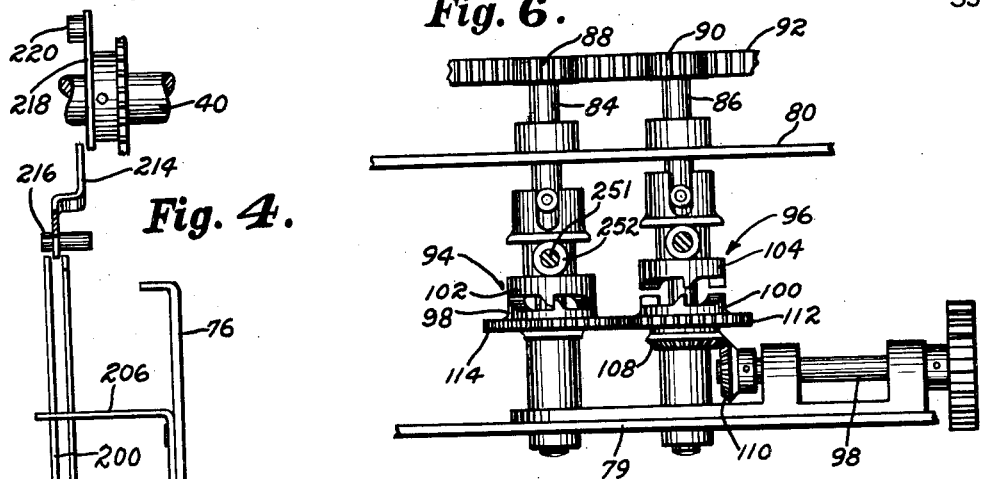
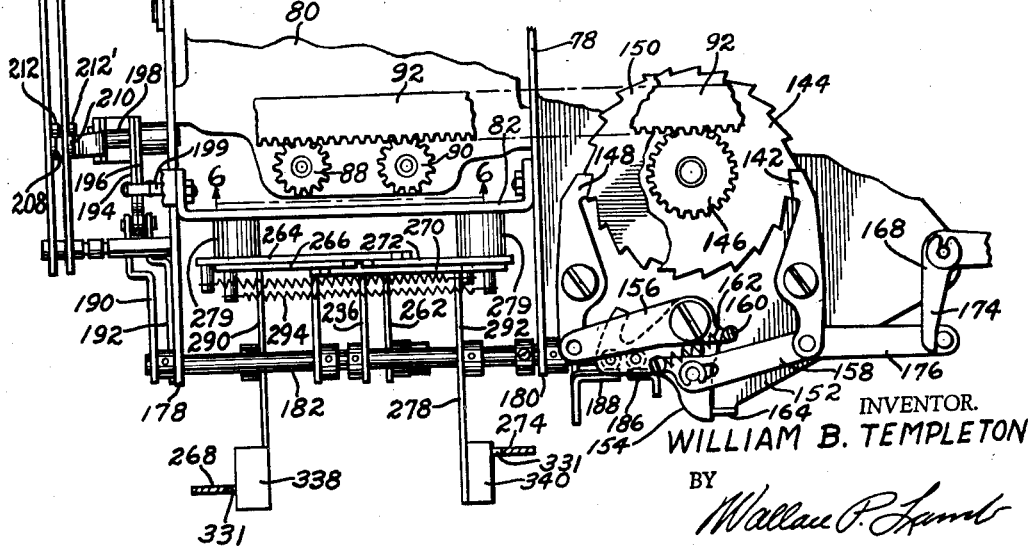

INVENTOR.
WILLIAM B. TEMPLETON
BY
ATTORNEY.

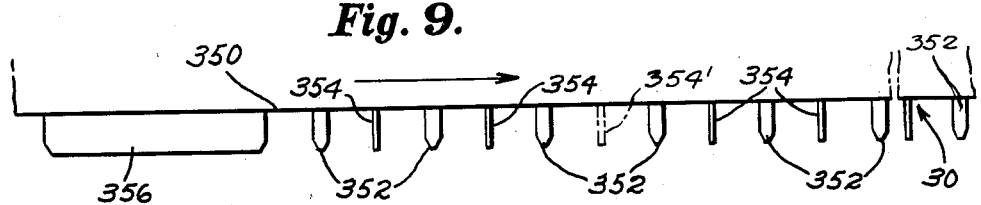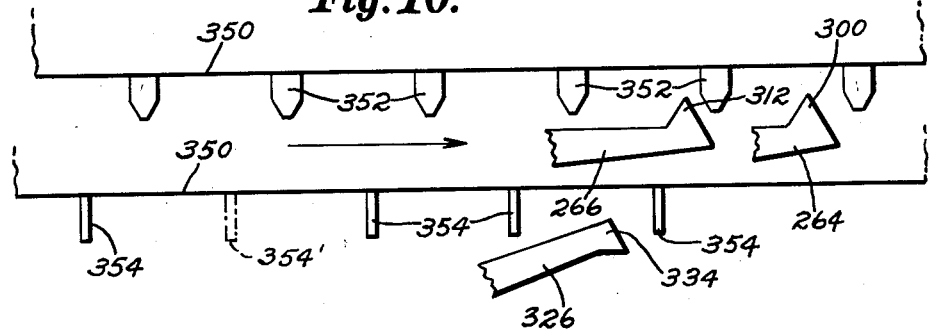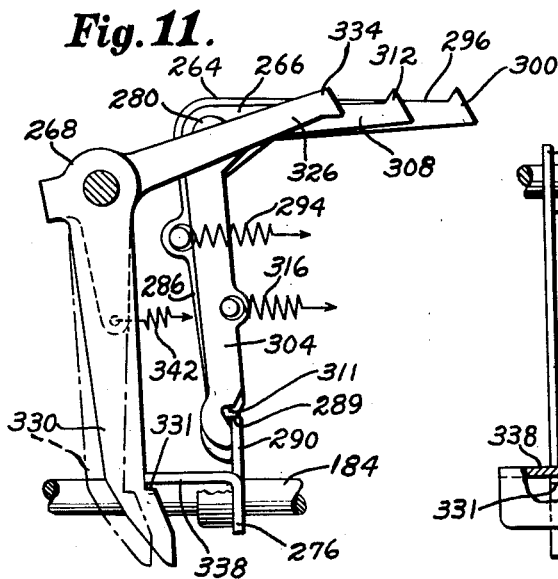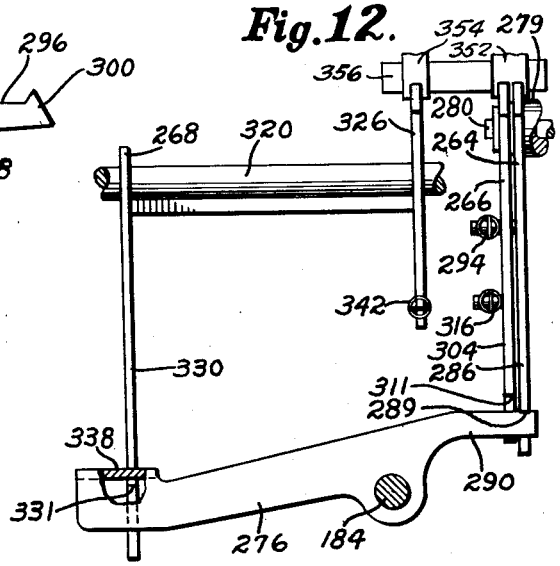

United States Patent Office 3,007,564
Patented Nov. 7, 1961

3,007,564
CARRIAGE TABULATION CONTROL MECHANISM FOR CALCULATING MACHINES
William B. Templeton, Northville, Mich., assignor to Burroughs Corporation, Detroit, Mich., a corporation of Michigan
Filed Mar. 12, 1958, Ser. No. 720,992
9 Claims. (Cl. 197—177)

This invention relates generally to calculating machines of the type having a movable carriage and particularly to a carriage tabulation control mechanism therefor.

It is the principal object of my invention to provide for calculating machines, an improved carriage controlled tabulation mechanism of a character to effect relatively short distances of travel of the carriage for certain accounting operations and/or relatively long distances of travel of the carriage for other accounting operations.

Another object of the invention is to provide for a calculating machine, an improved carriage control mechanism in which all tabulations of the carriage including digit spacing, columnar spacing, skip tabulation, etc., are entirely under carriage control.

Another object of the invention is to provide for actuating a carriage escapement automatically by carriage movement involving an improved control mechanism that makes it possible to program the machine to obtain columnar spacing, skip and return carriage movements together with single digit spacing movements of the carriage at any carriage position within the range of movement thereof.

Another object of the invention is to provide for a calculating machine carriage that is driven by a hysteresis clutch, an improved carriage control mechanism in which a retractable carriage holding pawl is held retracted for carriage movement greater than single digit spacing, independently of cycling operation of the machine to avoid the occurrence of an unsynchronized relationship between cycling operation and carriage movement upon fluctuations of voltage to the hysteresis clutch.

Other objects of the invention will become apparent from the following description, taken in connection with the accompanying drawings in which:

FIG. 4 is a fragmentary plan view;

FIG. 5 is a side view, as seen from left to right of FIG. 4;

FIG. 6 is a view partly in elevation and partly in section;

FIGS. 9 and 10 are diagrammatic views illustrating tabulation control of the carriage;

FIG. 11 is a view partly in elevation and partly in section of details of the carriage control mechanism; and FIG. 12 is a view looking from right to left of FIG. 11.

As the present invention resides in an improved tabulation and return mechanism for the carriage of a well known type of calculating machine, the drawings and description have been substantially restricted to said mechanism, but for a complete description of the calculating machine, reference may be had to Patent No. 2,629,549 to Thomas M. Butler, and to Patent No. 2,936,703 to Louis J. Gavasso.

Figure 1:
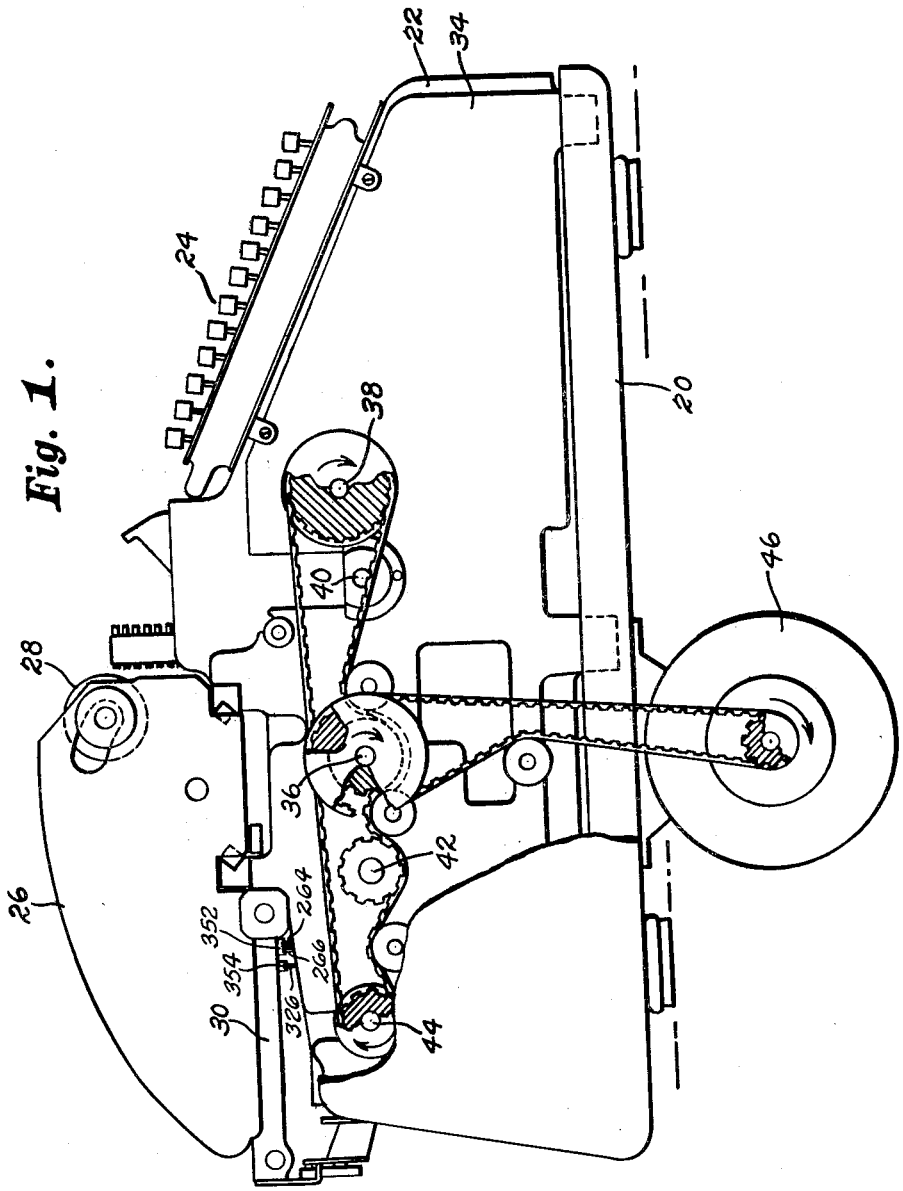
FIG. 1 is a side view of a calculating machine having parts broken away and in section, embodying features of my invention.

Referring to the drawings by characters of reference, and first to FIG. 1, the calculating machine shown includes a base 20 on which is a main frame structure including laterally spaced upright side plates 22 that support most of the mechanisms of the machine. Included among these mechanisms is the usual keyboard 24 at the front, and a movable carriage 26 at the rear of the main frame structure. Carried by, and located toward the front of carriage 26, is a paper platen 28 of the well known roller type, and suspended from the underside of the carriage 26 is a program control unit 30, which as is well known, automatically controls operations of the machine in accordance with carriage travel.

Outwardly of, and rigidly secured to the main frame side plates 22, are laterally spaced auxiliary supporting plates 34 in which are journaled a plurality of horizontal shafts 36, 38, 40, 42 and 44, driven from an electric motor 46 through suitable belt and pulley drive connections, as shown. From shaft 38 is driven the main cam shaft 40 which, among other functions, rotates each time the machine is cycled to actuate other mechanisms of the machine to perform desired calculations.

The shaft 42 is a component of the driving mechanism that rotates the paper platen 28 to obtain vertical or line spacing. The platen line spacing mechanism is substantially the same as that shown and described in detail in the above mentioned Butler patent. In general, such mechanism includes a pair of clutches 48 and 50 (see FIG. 2) which are rotatably mounted on a support or gear box 52. The clutch 48 comprises a lower driving component 54 and an upper driven component 56 and similarly, clutch 50 includes a lower driving component 58, and an upper driven component 60. Secured to the clutch driving components 54, 58, are gears 62 which are driven by a pinion 64 on a shaft 66 that is in turn driven from shaft 42 through pulleys 68 and a belt 70. Crank arms 72 and 74 are provided respectively on the upper clutch components 56 and 60, and these arms are operatively connected to the platen 28 by mechanism (not shown) disclosed in detail in the patent to Butler and otherwise well known in the art.

The tabulation control mechanism includes the gear box 52 which preferably has spaced sides 76 and 78, a bottom wall 79, a top wall 80, and a rear wall 82. As shown, the gear box 52 is mounted on the main frame of the machine, beneath the carriage 26. Journaled in the top wall 80 of the gear box 52 is a pair of vertical shafts 84 and 86 (see FIGS. 4 and 6) to the upper ends of which is secured respectively a pair of pinions 88 and 90 that mesh with a gear rack 92 which is rigidly secured to the underside of the carriage 26. Below the gear box top wall 80 is a pair of clutches 94 and 96 for operatively connecting the pinion shafts 84 and 86 to a clutch driving shaft 98 as shown in FIG 6. The clutches 94 and 96 each have a lower component 98 and 100 respectively and these clutch components are rotatably mounted in the bottom wall 79 of the gear box 52. The other or upper clutch components, as at 102 and 104 respectively of the clutches 94 and 96, are vertically slidable on the lower ends of the pinion shafts 84 and 86 to engage and/or disengage with the lower clutch components 98 and 100. As shown, the upper clutch components 102 and 104 rotate the pinion shafts 84 and 86 through pin and slot connections to allow for shifting of the clutch components to engage and/or disengage the clutches. As indicated in FIG. 6, clutch 94 functions to move the carriage in a tabulating direction and clutch 96 functions to move the carriage in the opposite, or return direction. Clutch component 100 has a bevel gear 108 secured thereto which meshes with a driving pinion 110 that is secured on driving shaft 98. Another gear 112 secured to clutch component 104 meshes with a similar gear 114 on clutch component 98 to rotate the clutches in opposite directions.

The clutch driving shaft 98 is driven from motor shaft 44 (see FIG. 2) through a hysteresis clutch 116 which is used, among other reasons, to obtain a quick and smooth action in moving the carriage. The hysteresis clutch 116 is a well known device and therefor is not shown or described in detail. In general, such devices include an electrical field element which, in the present instance, is connected by a shaft 118 to shaft 44 for continuous rotation during operation of motor 46. The driven element of the hysteresis clutch 116 drives a shaft 120 on which a pulley 122 drives shaft 98 through a drive belt 124. One of the elements of the hysteresis clutch 116 is electrically energized which effects a magnetic drag to rotate the other element. To energize the hysteresis clutch 116 there is secured to the shaft 118 a pair of slip rings 126 and 128 engaged respectively by a pair of brush holding arms 130 and 132 respectively, the brushes being connected to a source of electrical energy by leads 134 and 136 (see FIG. 2). In lead 134 is a resistance 138 controlled by a normally open switch 140 which when closed decreases the effectiveness of resistance 138 to increase current flow to the hysteresis clutch 116.

Thus, when switch 140 is open, the hysteresis clutch 116 is exerting a relatively small force acting through the normally engaged tabulation clutch 94 to move the carriage 26 in a tabulating direction. For a more complete understanding of the hysteresis clutch 116, reference may be made to Patent No. 2,571,762 to Stanley R. Rich.

Holding the carriage 26 against tabulation movement by the hysteresis clutch 116 is a retractable stop member or pawl 142 (see FIGS. 3 and 4) which normally engages a ratchet wheel 144 that has a pinion 146 in mesh with the carriage rack 92. A second retractable stop member or pawl 148 is provided to hold the carriage 26 against return movement and normally engages a second ratchet wheel 150. The two ratchet wheels 144, 150 are secured together to rotate about a common vertical axis, the ratchet wheels being journaled in the horizontal leg 152 of a bracket which is secured to side 78 of the gear box 52. The pawls 142 and 148 are pivoted on the leg 152 of the bracket and the outer ends of the pawls are pivotally connected to a common pawl operating lever 154 by means of links 156 and 158. Adjacent ends of the links 156 and 158 each extends beyond its pivotal connection with lever 154, and has an upturned lug 160 to which to attach the ends of a helical coil spring 162. Spring 162, under tension, acts to return and hold the pawls 142 and 148 in engagement with the ratchet wheels 144 and 150. An upturned tab 164 on bracket 152 serves as a stop for the pawl operating lever 154 to limit rotation of the lever by the spring 162.

Figures 2, 3:
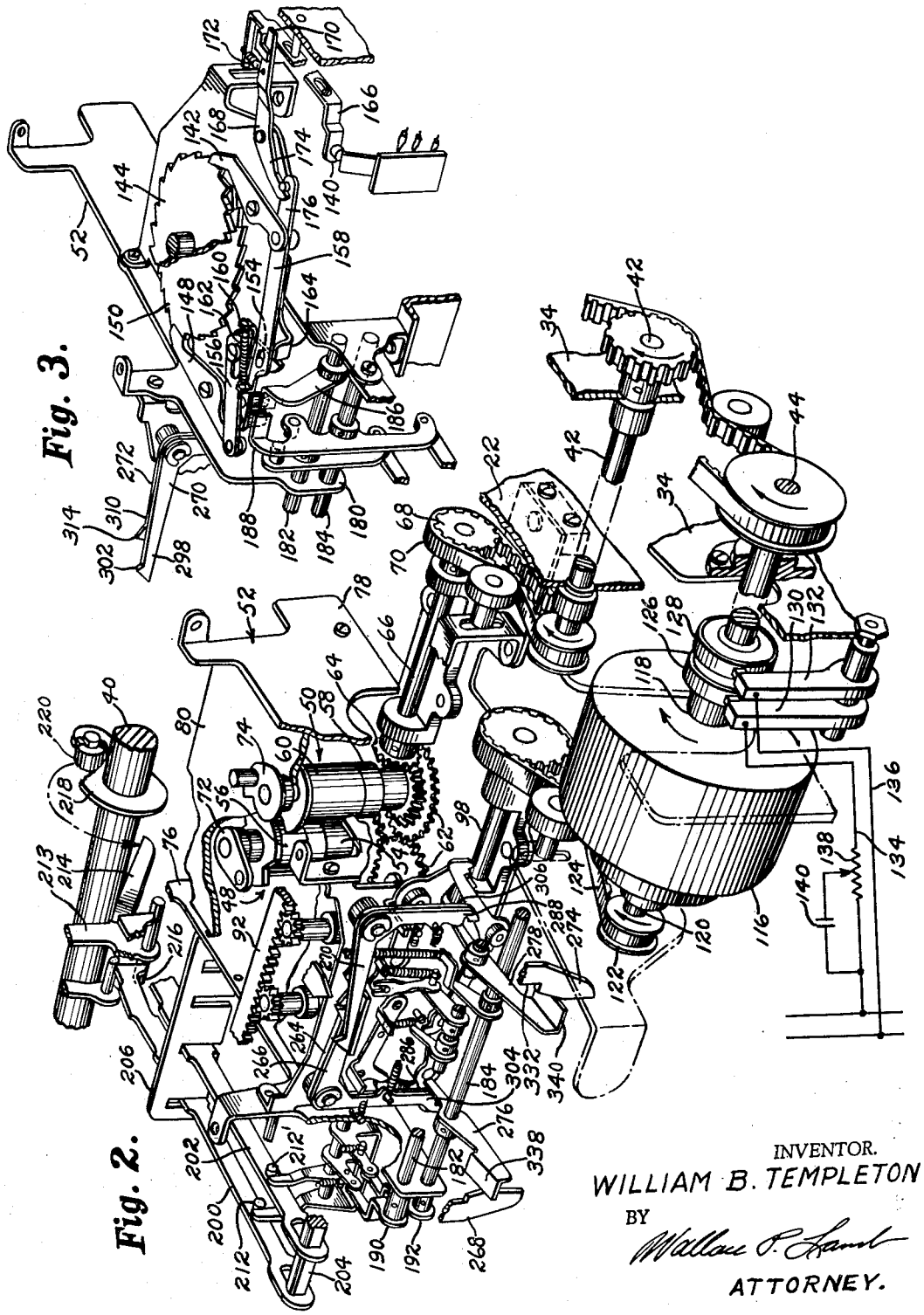
FIG. 2 is a perspective view of my improved carriage tabulation control mechanism and associated devices.
FIG. 3 is a perspective view of certain details of the tabulation control mechanism.

When the pawls 142 and 148 are retracted from the ratchet wheels 144 and 150, the carriage 26 is free to move and at the same time, the switch 140 is closed so that the full force of the hysteresis clutch 116 is applied to moving the carriage. As shown in FIG. 3, the movable contact of switch 140 is on the end of a slide 166 that is moved to close the switch 140 by a lever 168, pivoted on the horizontal leg 152 of the bracket. The lever 168 has an arm 170 held to the slide 166 by a spring 172. Another arm 174 of lever 168 is engaged by a stud on an extension 176 of link 158 such that when the pawl operating lever 154 is rotated to retract the pawls 142 and 148, lever 168 is rotated clockwise (FIG. 3) and through spring 172 moves slide 166 rearward to engage the contacts of switch 140.

Figure 8:
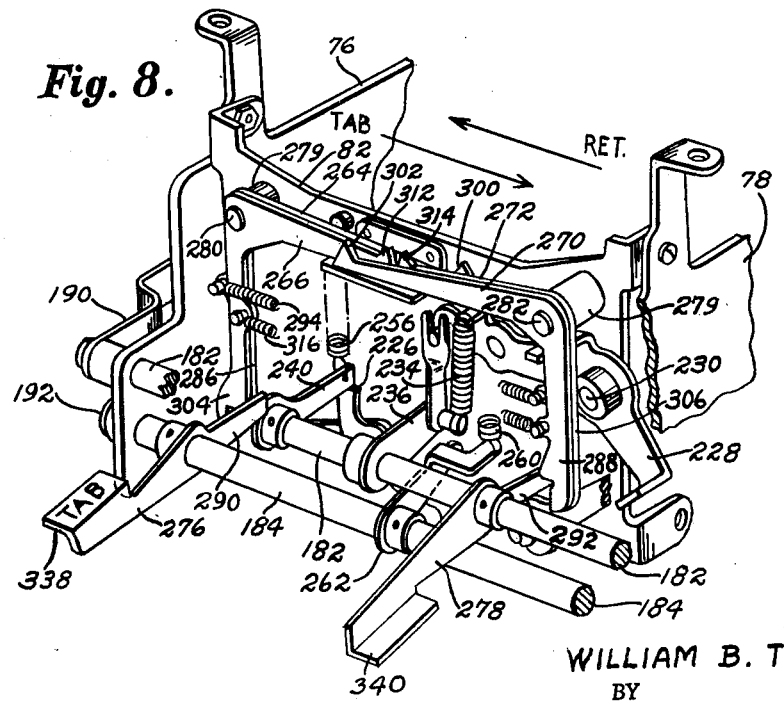

The sides 76 and 78 of the gear box 52 extend rearwardly from the gear box rear wall 82, as at 178 and 180 respectively, and journaled in these extensions is a pair of vertically spaced horizontal shafts 182 and 184 (see FIGS. 3 and 8). Ends of the shafts 182 and 184 extend beneath the bracket leg 152 where a pair of levers 186 and 188 are respectively secured to the shafts for actuating the pawl operating lever 154. As shown, the upper ends of levers 186 and 188 respectively engage a pair of depending studs on an arm of lever 154 such that when either of the shafts 182 or 184 is rotated clockwise, as seen in FIG. 3, the lever 154 is pivoted in a direction to retract pawls 142 and 148 from the ratchet wheels 144 and 150. To the other ends of the shafts 182 and 184 are secured respectively a pair of levers 190 and 192 (see FIGS. 4 and 8) which have free ends respectively pivotally connected to the free ends of a pair of levers 194 and 196 which pivot freely on a shaft 198 that is secured at one end thereof in and to the side wall 76 of the gear box 52.

A pair of laterally positioned slides 200 and 202 are individually movable to rotate levers 194 and 196 respectively, the slides being slidably supported near their rear ends on a horizontal pin 204 on gear box extension 178, and in slots of a comb type guide 206 secured to gear box side 76 (see FIGS. 2 and 5). The levers 194 and 196 are of the yoke type each having an operating arm 208 and 210 respectively engaged by studs 212 and 212' on the slides 200 and 202. The slides 200 and 202 are urged forwardly, or to their normal positions by springs 197 acting on levers 194 and 196, the springs 197 being anchored at their upper ends on a pin 199 secured in the gear box side 76.

Disposed at the forward ends of the slides 200 and 202 (see FIG. 5) is an actuator or lever 213 having a striker arm 214 that carries a transversely extending pin 216, positioned to engage the ends of one or the other of the slides. The lever of striker arm 214 is pivoted on the main frame 22 of the machine and is actuated or pivoted by a cam 218 on shaft 40, carrying a roller 220 that strikes and pivots the lever each revolution of the shaft 40. Slide 200 is moved rearwardly by the striker arm 214 when tabulation of the carriage 26 is to be effected and slide 202 is moved rearwardly when return movement of the carriage is to be effected. Consequently, provision is made so that the striker arm pin 216 will not strike the forward ends of both of the slides 200 and 202 at the same time. To provide for this, the slides 200 and 202 are supported as shown, such that normally they are pivoted to positions in which tabulation slide 202 has its forward end raised to clear the striker arm pin 216 and return slide 200 has its forward end lowered for engagement with the pin. To reverse the positions of the slides 200, 202 so that the return slide 202 will be in position to be moved by the striker arm 214, there is a lever 222 which is arranged to pivot the return slide 202 such that the forward end of the slide moves down, which in turn pivots a bell crank lever 224 that pivots the tabulation slide 200 such that the forward end thereof moves up. A coil spring 225 pivots the return slide 202 to its normal position shown, upon release of the slide by lever 224. Operation of the lever 222 may be under control of the program unit 30 through interconnecting linkage (not shown), all of which is old in the art and described in detail in the aforementioned Butler patent.

Figure 7:
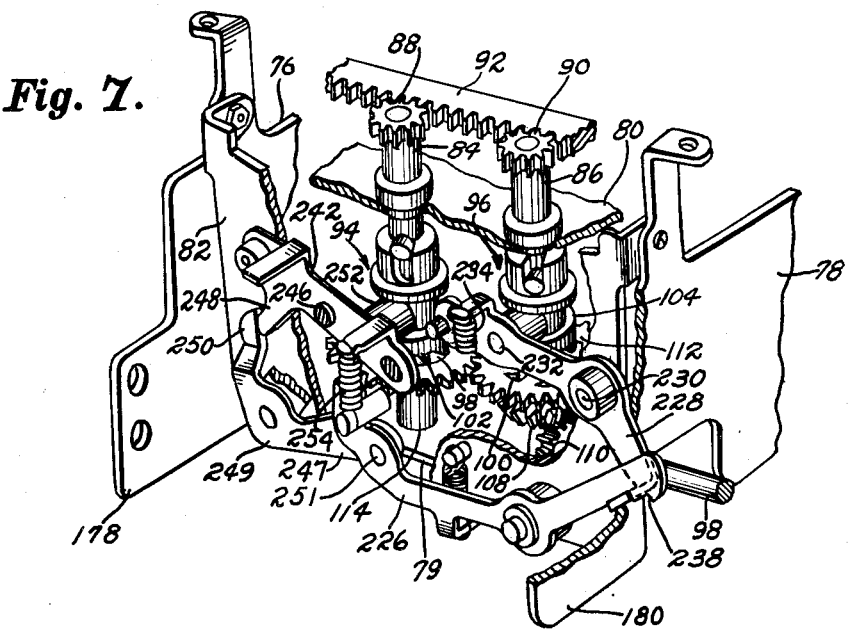
FIGS. 7 and 8 are similar perspective views of details of the tabulation control mechanism.

Mounted on the rear wall 82 of the gear box 52 (see FIGS. 7 and 8) is a mechanism including a latch 226 and a lever 228 for shifting the clutches 94 and 96 to effect a return movement of the carriage 26. The parts of the mechanism are shown in their normal positions, in which positions the tabulation clutch 94 is engaged and the return clutch 96 disengaged. The lever 228 is pivoted on a stub 230 secured in and to the gear box rear wall 82. One arm of the lever 228 is pivotally connected by a pin 232 to a hollow boss on the upper component 104 of the return clutch 96 such that pivoting of lever 228 in one direction engages the normally open clutch. A helical coil spring 234 acts to pivot lever 228 in a direction to engage the upper clutch component 104 with the lower clutch component 100. One end of the spring 234 is attached to a tab on lever 228 and the other end of the spring is attached to the free end of a lever 236 which is secured to the return shaft 182.

The latch 226 is pivoted on the gear box rear wall 82 and has an arm provided with a hooked end, as at 238, that normally engages and holds lever 228 latched against movement by spring 234. Another arm of the latch 226 is engaged by the free end of a lever 240 which is secured on and to the return shaft 182. When the return shaft 182 is rotated as a result of slide 202 being moved rearwardly, lever 240 pivots latch 226 which allows lever 228 to be pivoted in a direction to engage clutch 96. As the return shaft 182 is being rotated to the latch releasing position, lever 236 is pivoted in a direction which further tensions spring 234 such that when the latch 226 does release the lever 228, spring 234 acts with additional force to engage return clutch 96 with a quick, snap-like action. At the same time that the return clutch 96 is engaged, the tabulation clutch 94 is disengaged by a lever 242 that is actuated also by the latch 226. As is more clearly shown in FIG. 7, the lever 242 is pivoted, as at 246, on the gear box rear wall 82 and has an arm 248 engaged by a similar arm 250 of a bell crank lever 249. The bell crank lever 249 is pivoted on the gear box rear wall 82, and has an arm 247 that is pivotally connected, as at 251, to lever 226. The lever 242 is pivotally connected by a pin to a hollow boss 252 of the tabulation clutch upper component 102. A coil spring 254 connected at one end thereof to a lug on lever 242 and at the other end to a pin on wall 82, acts to engage the tabulation clutch 94. Thus, when the latch 226 is pivoted by lever 240 to engage the return clutch 96, the latch 226 also pivots lever 242 in a direction to disengage the tabulation clutch 94. A coil spring 256 has one end anchored to the gear box rear wall 82 and the other end attached to lever 240, the spring acting to rotate the return shaft 182 to its normal position, or position shown. Similarly, a coil spring 260 connected to the gear box 52, and to the free end of a lever 262, acts to return the tabulation shaft 184 to normal position.

The above described mechanism operates as follows to effect release of the carriage for movement in a tabulation direction or movement to the left, as viewed from the front of the machine: Each time that the machine is cycled, such as by depression of a motor bar, cam shaft 40 makes a complete revolution and the cam roller 220 pivots striker 214 which in turn strikes and moves slide 200 rearwardly and then releases the biased slide for return of the latter to its normal position. The interval of reciprocation of the slide corresponds to the time required for the carriage 26 to move a relatively short distance equivalent to a digit or letter space, preferably the standard one-tenth of an inch tabulation currently used on typewriters. Movement of the slide 200 rearwardly, pivots arm 208 and the interconnected levers 196 and 192 which rotates shaft 184 in a clockwise direction as seen in FIG. 8. The lever 188 rotates with shaft 184 and pivots lever 154 which through link 158 pivots and retracts pawl 142 from ratchet wheel 144. The ratchet 144 is designed such that the spaces between the teeth thereof correspond to the aforementioned one-tenth inch carriage tabulation, and the pawl 142 operating in accordance with the operation of striker 214 successively releases and engages the teeth of the ratchet to effect minimum or one-tenth tabulation movement of the carriage 26.

In order to retract the pawls 142 and 148 for intervals corresponding to relatively long distances of travel of the carriage 26, such as the well known columnar spacing operation, or the skip tabulation operation, I provide two sets of releasable pawl holders, or latches arranged to respond to pawl retraction to hold the pawls retracted for carriage travel equal to rotation of the ratchet wheels two or more teeth spaces. One of these sets of latches includes a primary tabulation latch 264, a secondary tabulation latch 266, and a tabulation skip latch 268. The other of the sets of latches includes a primary return latch 270, a secondary return latch 272, and a tabulation skip latch 274. Secured on and rotatable with shaft 184 is a lever 276 that is latched by the latches 264, 266 and 268 to hold the pawl 142 retracted to effect different distances of tabulation movement of the carriage, and secured to and rotatable with shaft 182 is a lever 278 that is latched by latches 270, 272 and 274 to latch the pawl 148 retracted to effect different distances of return movement of the carriage.

The primary latches 264 and 270 are freely pivoted respectively on horizontally spaced pins 280 and 282 that are secured in the gear box rear wall 82 and extend rearwardly therefrom through sleeve spacers 279. Also, the secondary latches 266 and 272 are freely pivoted respectively on the pins 280 and 282, flat against and between the primary latches 264 and 270.

Each of the primary latches 264 and 270 has a depending arm 286 and 288 respectively, which at their lower ends are notched to provide a downwardly facing latching edge 289 to latch with forwardly extending arms 290 and 292 of the levers 276 and 278 respectively. Normally, the latch arms 290 and 292 are both in the unlatched positions shown in FIG. 8, urged against the sides of arms 286 and 288 respectively by a tensioned coil spring 294 that has its opposite ends respectively connected to the arms. When one or the other of the lever arms 290 and 292 are rotated in a direction to retract one or the other of the pawls 142 and 148, respectively, the corresponding one of the lever arms 290, 292 will be lowered below the notch in the latch, whereupon the spring 294 will snap the latch into holding relation with the arm. Further, each of the latches 264 and 270 has a trip arm 296 and 298 respectively, which extend in the general direction of travel of carriage 26, the arms 296 and 298 having over-lapping end portions. Formed on the free end of each of the trip arms 296 and 298 is an upwardly directed cam 300 and 302 respectively which are disposed in spaced relation longitudinally of the carriage 26, movement of which is utilized to trip the latches.

The secondary latches 266 and 272, as shown in FIG. 8, are similar to the above described primary latches in having depending latch arms 304 and 306, and substantially horizontal trip arms 308 and 310. The trip arms 308 and 310 of the secondary latches have their free ends in opposed close proximity, and substantially midway between the spaced apart free ends of the primary trip arms 296 and 298. Similar upwardly directed cam surfaces 312 and 314 are provided on each of the free ends of the secondary trip arms, as shown. A helical coil spring 316 under tension urges the secondary latches 266 and 272 toward latched position above the latch arms 290 and 292. As a consequence, when one of the primary latches, say latch 264 engages and latches with lever arm 290, the secondary latch 266 will also move above the arm 290 in position to assume the latching function, but is ineffective so long as the primary latch remains in latched position. This is provided for by having the downwardly facing latch edges, as at 311, of the secondary latches 266 and 272 slightly higher than the corresponding latch edges 289 of the primary latches 264 and 270.

The upstanding cams 300 and 302 on the trip arms of the primary latches 264 and 270, and the similar cams 312 and 214 on the trip arms of the secondary latches 266 and 272 are arranged such that the program control unit 30 passes thereover and trips the latches under certain conditions determined by the program.

With reference particularly to FIG. 5, the skip tabulation latches 268 and 274 are freely pivoted on a pair of parallel shafts 320 and 322 which may be supported on the main frame of the machine and also on the gear box 52 by a bracket 324. Each of the latches 268 and 274 is preferably formed with a bail to provide the latches with laterally offset arms including upper trip arms 326 and 328 and lower latch arms 330 and 332, respectively. The offset trip arms 326 and 328 extend in the general direction of travel of the carriage 26 and have upwardly directed free ends 334, only one of which is shown in FIGS. 10, 11 and 12, the arms being arranged such that the program control unit passes thereover to trip the latches when such operation is called for by the program. The free ends 334 and 336 of the trip arms are spaced apart along the path of travel of the carriage 26, outwardly of the corresponding free ends of the secondary latches 266 and 272. The lower latch arms 330 and 332 are notched adjacent their lower ends providing upwardly facing latching edges 331 for latching cooperation with flanges 338 and 340 respectively of the lever arms 276 and 278. Spring 342 under tension, urges the latching arms 330 and 332 into latching relation with the lever arms 276 and 278. Normally, the latch arms 330 and 332 are in their unlatched positions in which they are held against the flanged edges of lever arms 330 and 332 by the tensioned spring 342. The upwardly facing latch edges 331 of the skip latch 268 are vertically positioned intermediate the corresponding latch edges 289 and 311 of the primary and secondary latches. By this arrangement, when one of the pawls 142 or 148 is retracted, the primary, secondary and skip latch of the corresponding set of latches all move to their latching positions. However, initially only the primary latch is holding the pawl retracted, the others, being in position subsequently to assume the holding function.

The program control unit 30 includes a support 350 on which are secured two parallel rows of latch actuators or abutments 352 and 354. Abutments 352 are provided to trip the primary latches 264, 270 and the secondary latches 266 and 272, and the abutments 354 are provided to trip the skip latches 268 and 274. The abutments 352 and 354 depend from the underside of their support and the number and relative spacing of the abutments will be determined by the particular program of desired machine operations to be performed. For a more detailed description of the program control unit 30, reference may be had to the above mentioned Butler patent.

Referring now particularly to FIGS. 9 to 12 inclusive, these views illustrate how the above described carriage control mechanism effects tabulation including columnar spacing, skip tabulation and single digit spacing carriage tabulation. In the following description of operation, reference is made only to the set of latches 264, 266 and 268 with respect to tabulation movement of the carriage since the similar set of latches 270, 272 and 274 operates in the same manner, the difference being only in the direction of carriage travel. In FIG. 9, the carriage tabulates to the right as indicated by the arrow, or normally the direction the carriage would move as seen from the rear of the machine. The abutments 352 are arranged on the underside of the carriage 26 in a row extending longitudinally of the path of carriage travel and directly above the upper ends of the latches 264, 266, as shown in FIG. 12, the abutments 352 being sufficiently wide and arranged so that they can strike both of the latches 264 and 266. The abutments 352 are equally spaced apart for a predetermined range of carriage travel, the spacing corresponding to columnar spacing. The other abutments 354 are arranged in a row in parallel spaced relation to the row of abutments 352 and in staggered relation thereto, as seen in FIG. 9. As shown in FIG. 12, the row of abutments 354 is arranged directly above the upper end of the latch 268 to strike and actuate the latch. The spacing of the abutments 354 is the same as the spacing of abutments 352 except where it is desired to effect a skip tabulation in which event one or more of the abutments as illustrated by the dot and dash abutment 354′ is omitted. For purposes of illustration, the abutments 352 and 354 are relatively arranged to trip the latches such that the carriage 26 will move distances corresponding to columnar spaces, then perform a skip tabulation operation and finally tabulate one digit spacing. The latter operation is effected by providing an elongated block 356 on the control unit 30 adapted to disable the primary latch 264 and secondary latch 266 to free the pawls 142 and 148 for normal one tooth spacing operation.

In operation, as previously mentioned, each time that the cam shaft 40 rotates and actuates the striker arm 214, slide 200 is moved rearwardly which through rotation of lever 192, shaft 184, lever 186 and pawl operating lever 156, retracts pawl 142 which releases the carriage 26 for movement. Since the tabulation clutch 94 is normally engaged and switch 140 is closed when pawl 142 is retracted, the hysteresis clutch 116, under full power, will move the carriage at a substantially constant rate of movement toward the right facing FIG. 10 to begin columnar tabulation. Also when the pawl 142 is retracted, lever 276 is rotated in a direction, and to a position where the primary latch 264 is moved by its spring 294 into latching relation with lever arm 290 to hold the pawl 142 retracted. Latches 266 and 268 are also biased into holding positions with the arms of lever 276, but are ineffective because the latch edge 311 is higher than the latch edge 289 of the primary latch 264 and the latch edge 331 is lower than the latch edge 338 of the skip latch 268. When the latches 264, 266 and 268 are in latching positions, the upper ends of latches 264 and 266 are in the path of abutments 352 and the upper end of latch 268 is in the path of abutments 354. As the carriage 26 moves to the right, the second of the abutments 352 from the right, facing FIG. 9, strikes the upwardly directed free end of the primary lever 264 and trips the lever to disengage it from arm 290 of lever 276. At the same time that the primary latch 264 is tripped, the second of the abutments 354 from the right pivots the skip latch 268 such that the lower end 330 of the skip latch is moved away from the lever arm 338, as shown in dot and dash lines (see FIG. 11), which allows the lever 276 to pivot slightly until it engages and is held by the secondary latch 266. As the carriage 26 continues to move, the third of the abutments 352 from the right engages and trips the secondary latch 266 which releases the pawl 142 to stop the carriage. It will be appreciated that for the above described columnar spacing operation, the skip latch 268 is in effect, in the way, and therefore is pivoted out of latching position, so that the function of holding the pawl 142 retracted is transferred from the primary latch 264 to the secondary latch 266, to achieve the desired pawl retracted interval corresponding to the desired columnar spacing.

In the performance of a skip tabulation operation, this is demonstrated by omitting the abutment 354′ shown in dot and dash lines (see FIGS. 9 and 10). Where this abutment 354′ is omitted, it will be understood that following tripping of the primary latch 264 by the fifth abutment 352 from the right (FIG. 10) the pawl holding function is transferred from the primary latch 264 to the skip latch 268, and during said transfer the next, or sixth abutment 352, pivots and passes the unlatched secondary latch 266, after which the fourth abutment 354 from the right trips the skip latch 268. Whereas in columnar tabulation, the primary latch 264 and the skip latch 268 are tripped at substantially the same time, in skip tabulation, the tripping of the skip latch 268 is delayed by reason of the greater distance between the second and third abutments 354 from the right, FIG. 10. Tripping of the skip latch 268 transfers the pawl holding function to the secondary latch 266 which is tripped by the next succeeding or seventh abutment 352 from the right which releases the pawls, and as a consequence, stops the carriage. Thus, in the case of skip tabulation of the carriage, the three latches 264, 268 and 266 successively assume the pawl holding function for the desired interval to skip one of the abutments 352.

When the carriage 26 moves to the right such that the elongated block 356 is depressing the primary latch 264, the secondary latch 266, and the skip latch 268 these latches are disabled and the pawl 142 is now free to retract for an interval equal to the time required for movement of the ratchet 144 one tooth or digit spacing. Thus, when the latches 264, 266 and 268 are free to function, columnar tabulation or skip tabulation of the carriage may be effected, but when the latches are disabled, movement of the carriage is controlled by the normal one tooth spacing operation of the pawl and ratchet.

From the foregoing description, it will now be appreciated that I have provided an improved control mechanism for controlling predetermined operations of a calculating machine carriage such as single digit spacing, columnar spacing, skip tabulation, etc., entirely under carriage control. It will be understood that by having the tabulation control mechanism controlled entirely by carriage movement, or independent of operation of other components of the calculating machine, that I am able to obtain the advantages of using a hysteresis clutch without any ill effects from variations of voltage to the hysteresis clutch.

What is claimed is:

1. In a calculating machine, supporting means, a movable carriage on said supporting means, drive means acting to move said carriage, a retractable pawl biased to normally hold said carriage against movement, an actuator operable to retract said pawl, a pair of latches on said supporting means spaced apart in the direction of travel of said carriage, said latches responsive to retraction of said pawl to move to positions in which one of said latches holds said pawl retracted and the other of said latches positions to subsequently hold said pawl retracted upon release of said one latch, and a pair of abutment members on said carriage spaced apart in the direction of carriage travel and respectively engaging and releasing said latches to release said pawl.

2. In a calculating machine, supporting means, a movable carriage on said supporting means, a retractable pawl normally holding said carriage against movement, an actuator operable independently of carriage movement to retract said pawl, a pair of latches on said support spaced apart in the direction of travel of said carriage, said latches responsive to retraction of said pawl to move to positions in which one of said latches holds said pawl retracted and the other of said latches positions to subsequently hold said pawl retracted on release of the first latch member, a pair of abutment members on said carriage spaced apart in the direction of carriage travel and respectively engaging and releasing said latches to release said pawl, and another abutment member movable with said carriage and operable to render said latches ineffective.

3. In a calculating machine having a movable carriage and power means acting to move the carriage, a mechanism for controlling tabulation of the carriage to effect either relatively short or relatively long distances of travel of the carriage, comprising, a retractable pawl biased to a carriage holding position, an actuator operable to retract said pawl for an interval and then release said pawl to limit travel of the carriage to a predetermined distance of travel, a pair of spaced apart abutment members movable together with said carriage and normally restrained by said pawl, a first latch member normally inactive and responsive to retraction of said pawl to hold said pawl retracted, a second latch member normally inactive and responsive with said first latch member to retraction of said pawl to move to a position to hold said pawl retracted upon release of said first latch member, said latch members having latch releasing arms in spaced apart relationship in the path of travel of said abutment members, said abutment members in their normally restrained positions located in alternate spaced relation with respect to the spaced releasing arms of said latch members to effect respective and successive release of said latch members upon predetermined movement of said abutment members, and another abutment member movable with and spaced from said pair of abutment members to engage and hold said latch members in released positions irrespective of retraction of said pawl by said actuator.

4. In an accounting machine, a movable carriage, drive means acting to move said carriage at a substantially constant rate of speed, a retractable pawl normally holding said carriage against movement by said drive means, a cyclically operable actuator operable when activated to retract said pawl for an interval corresponding to the time required for the carriage to travel a predetermined distance, a latch member operable in response to operation of said cyclically operable actuator to latch said pawl in retracted position to effect carriage travel for a distance greater than said predetermined distance, an abutment member movable with said carriage to trip said latch member and thereby release said pawl to stop said carriage, and an actuator carried by said carriage and operable within a predetermined portion of the range of travel of said carriage to disable said latch member.

5. In an accounting machine, a movable carriage, drive means acting to move said carriage at a substantially constant rate of speed, a retractable pawl normally holding said carriage against movement by said drive means, a cyclically operable actuator operable when activated to retract and release said pawl to effect a predetermined distance of carriage movement by said drive means, a latch member operable in response to operation of said cyclically operable actuator to hold said pawl retracted irrespective of release of said pawl by said cyclically operable actuator, an abutment member movable with said carriage to strike and release said latch member and tending to stop said carriage, a second latch member spaced from said first latch member longitudinally of the path of carriage travel, said second latch member responsive to operation of the cyclically operable actuator to latch said retracted pawl on release of said first latch member, and a second abutment member spaced from the first longitudinally of carriage travel to strike and release said second latch member to stop said carriage.

6. In an accounting machine, a movable carriage, drive means acting to move said carriage at a substantially constant rate of speed, a retractable pawl normally holding said carriage against movement by said drive means, a cyclically operable actuator operable when activated to retract and release said pawl to effect a predetermined distance of carriage movement by said drive means, a latch member operable in response to operation of said cyclically operable actuator to hold said pawl retracted irrespective of release of said pawl by said cyclically operable actuator, an abutment member movable with said carriage to strike and release said latch member and tending to stop said carriage, a second latch member responsive to operation of the cyclically operable actuator to latch said retracted pawl on release of said first latch member, a second abutment member spaced from the first longitudinally of carriage travel to strike and release said second latch member to stop said carriage, and a cam movable with said carriage and operable in one portion of the range of carriage travel to hold said latches ineffective to retract said pawl.

7. In an accounting machine, a movable carriage, drive means acting to move said carriage, a retractable pawl normally holding said carriage against movement by said drive means, a cyclically operable actuator operable when activated to retract said pawl for an interval to effect a predetermined distance of travel of said carriage, a latch member operable in response to the cyclical operation of said actuator to latch said pawl in retracted position, a second latch member spaced from said first latch member longitudinally of the path of carriage travel, said second latch member responsive to the cyclical operation of said actuator and movable into a position to hold the pawl retracted, a latch actuator to move with said carriage and actuate said first latch member to transfer the pawl holding function to said second latch member without retracting said pawl, a second latch actuator movable with said carriage and spaced from said first latch actuator to strike and release said second latch member to effect a carriage travel greater than said first predetermined distance of travel, and a third latch actuator movable with said carriage into a portion of the range of carriage travel disabling said first and second latch members to effect said first predetermined distance of travel of said carriage under control of said cyclically operable actuator.

8. In an accounting machine, a movable carriage, drive means acting to move said carriage, a retractable pawl normally holding said carriage against movement by said drive means, a cyclically operable actuator operable when activated to retract and release said pawl to effect a predetermined distance of travel of said carriage, a primary latch member responsive to retraction of said pawl by said operator to latch said pawl retracted, a secondary latch member responsive to retraction of said pawl by said operator to move to a position to latch said pawl retracted, a skip latch member responsive to retraction of said pawl by said actuator and movable to a position to latch said pawl retracted, a row of abutment members on said carriage equally spaced apart and arranged to successively strike said primary and secondary latches to transfer the holding function from the former to the latter, the spacing of said abutment members determining the distance of tabulation of said carriage under control of said secondary latch member, a second row of abutment members laterally positioned with respect to said first row of abutment members and in staggered spaced relation thereto, said second row of abutment members arranged to strike and move said skip latch out of latching position during control of carriage tabulation by said secondary latch member, at least two adjacent ones of the abutment members of said second row of abutment members spaced apart a distance greater than the distance between the other of the abutment members of said second row of abutment members to effect transfer of the latching function from said primary latch member to said skip latch member.

9. In an accounting machine, a movable carriage, drive means acting to move said carriage, a retractable pawl normally holding said carriage against movement by said drive means, a cyclically operable actuator operable when activated to retract and release said pawl to effect a single space tabulation of said carriage, a primary latch member arranged along the path of travel of said carriage and operatively connected to said pawl to hold the pawl latched in retracted position, a secondary latch member arranged adjacent said primary latch member in spaced relation thereto longitudinally of the path of carriage travel, said latch members biased to latching positions with the secondary latch member in position to hold said pawl retracted upon release of said primary latch member, a row of abutment members carried by said carriage to strike and release said latch members, said abutment members equally spaced apart longitudinally of the path of carriage travel and spaced apart distances to effect like distances of carriage tabulation equal to predetermined multiples of said single space tabulation, a skip latch member biased to latching position to receive the latching function from said primary latch member, skip latch member spaced longitudinally of the path of carriage travel from said primary and secondary latch members, a second row of abutment members carried by said carriage in laterally spaced relation to said first row of abutment members, said second row of abutment members in staggered relation to the abutment members of said first row and arranged to strike and move said skip latch out of latching position during carriage tabulations equal to multiples of said single space tabulations, at least two of the abutment members of said second row being spaced apart by a distance greater than the distance between the other of the abutment members of said second row of abutment members to render said skip latch effective to hold said pawl latched for a skip tabulation of said carriage, and another abutment member carried by and spaced longitudinally from the rows of abutment members, said another abutment member in one portion of the range of travel of said carriage to disable all of said latch members to effect single space tabulation of said carriage.

References Cited in the file of this patent

UNITED STATES PATENTS

| | | |
|---|---|---|
| 2,291,154 | Fettig | July 28, 1942 |
| 2,570,931 | Fleming | Oct. 9, 1951 |